US012469656B2

(12) United States Patent

Tsai et al.

(10) Patent No.: US 12,469,656 B2

(45) Date of Patent: Nov. 11, 2025

(54) KEYSWITCH AND KEYBOARD THEREOF

(71) Applicant: DARFON ELECTRONICS CORP., Taoyuan (TW)

(72) Inventors: Po-Wei Tsai, Taoyuan (TW); Wun-Huei Wang, Taoyuan (TW); Kuei-Lin Teng, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 204 days.

(21) Appl. No.: 18/372,705

(22) Filed: Sep. 26, 2023

(65) Prior Publication Data

US 2024/0120160 A1 Apr. 11, 2024

(30) Foreign Application Priority Data

Oct. 5, 2022 (TW) ................................. 111137784

(51) Int. Cl.

*H01H 13/20* (2006.01)
*H01H 13/14* (2006.01)
*H01H 13/702* (2006.01)

(52) U.S. Cl.

CPC ............ *H01H 13/20* (2013.01); *H01H 13/14* (2013.01); *H01H 13/702* (2013.01)

(58) Field of Classification Search

CPC ...... H01H 13/20; H01H 13/14; H01H 13/702; H01H 2009/0278; H01H 3/125; H01H 13/7065

See application file for complete search history.

(56) References Cited

U.S. PATENT DOCUMENTS

| | | | | |
|---|---|---|---|---|
| 5,504,283 | A | 4/1996 | Kako | |
| 8,581,125 | B2 * | 11/2013 | Chen | H01H 13/83 200/5 A |
| 9,941,070 | B2 * | 4/2018 | Liu | H01H 13/7006 |
| 10,755,878 | B1 * | 8/2020 | Liu | H01H 13/7065 |

FOREIGN PATENT DOCUMENTS

| | | | |
|---|---|---|---|
| CN | 202258932 | U | 5/2012 |
| CN | 203588891 | U | 5/2014 |
| CN | 104221113 | B | 4/2016 |
| TW | M469605 | U | 1/2014 |
| TW | M474242 | U | 3/2014 |
| TW | I697924 | B | 7/2020 |

* cited by examiner

*Primary Examiner* — Lheiren Mae A Caroc

(74) *Attorney, Agent, or Firm* — Winston Hsu

(57) ABSTRACT

A keyswitch includes a board, a cap located above the board, a membrane circuit board disposed on the board to make first and second engaging structures of the board protrude from first and second holes of the membrane circuit board respectively, and a lifting device. The lifting device is connected to the cap and the board and includes first and second support members. The first support member is movably connected to the cap and has a pivot end portion. The pivot end portion is movably connected to the first and second engaging structures and has a first abutting portion extending toward edges of the first and second holes along a pivot axis of the first engaging structure. The first abutting portion abuts on the membrane circuit board. The second support member rotatably intersects with the first support member and is movably connected to the cap and the board.

2 Claims, 5 Drawing Sheets

KEYSWITCH AND KEYBOARD THEREOF

BACKGROUND OF THE INVENTION

1. Field of the Invention

The present invention relates to a keyswitch and a keyboard thereof, and more specifically, to a keyswitch abutting a support member of a lifting device on a membrane circuit board to separate the support member from a board and a keyboard thereof.

2. Description of the Prior Art

A keyboard, which is the most common input device, could be found in variety of electronic apparatuses for users to input characters, symbols, numerals and so on. Furthermore, from consumer electronic products to industrial machine tools, they are all equipped with a keyboard for performing input operations.

A traditional keyswitch of the keyboard includes a cap, a scissor lifting structure, a membrane circuit board, a returning member, and a board. The membrane circuit board has switches and is disposed on the board. The scissor lifting structure is connected to the cap and the board to make the cap movable relative to the board. The returning member is positioned between the cap and the board to provide an elastic returning force, enabling the cap to automatically return to its original position. A common design for the scissor lifting structure involves embedding a connecting end portion of the scissor lifting structure (e.g., a pivot end portion or a sliding end portion) into a hole of the membrane circuit board to be engaged with a hook of the board. However, when a user presses the keyswitch to cause the scissor lifting structure to directly collide with the board, it may result in noise and shaft vibration since there is a gap between the connecting end portion of the scissor lifting structure and the hook, which affects the user's tactile experience. Moreover, as mentioned above, the membrane circuit board needs to form the hole corresponding to the hook, which easily causes the excessive hole area problem to impose unnecessary constraints on the routing space of the membrane circuit board.

SUMMARY OF THE INVENTION

The present invention provides a keyswitch including a board, a cap, a membrane circuit board, and a lifting device. The board has a first engaging structure and a second engaging structure. The cap is located above the board. The membrane circuit board is disposed on the board and has a first hole and a second hole formed corresponding to the first engaging structure and the second engaging structure respectively, to make the first engaging structure and the second engaging structure protrude from the first hole and the second hole respectively. The lifting device is connected to the cap and the board to make the cap movable relative to the board via the lifting device. The lifting device includes a first support member and a second support member. The first support member is movably connected to the cap and has a pivot end portion. The pivot end portion is movably connected to the first engaging structure and the second engaging structure and has at least one first abutting portion extending toward at least one first edge of the first hole and at least one second edge of the second hole along a pivot axis of the first engaging structure. The at least one first abutting portion abuts on the membrane circuit board to make the pivot end portion partially abut on the membrane circuit board for reducing an impact noise between the first support member and the board. The second support member is movably connected to the cap and the board. The second support member rotatably intersects with the first support member.

The present invention further provides a keyboard including a board and a plurality of keyswitches. The plurality of keyswitches is disposed on the board. At least one of the plurality of keyswitches includes a cap, a membrane circuit board, and a lifting device. The cap is located above the board. The membrane circuit board is disposed on the board. The board has a first engaging structure and a second engaging structure corresponding to the at least one of the plurality of keyswitches. The membrane circuit board has a first hole and a second hole formed corresponding to the first engaging structure and the second engaging structure respectively, to make the first engaging structure and the second engaging structure protrude from the first hole and the second hole respectively. The lifting device is connected to the cap and the board to make the cap movable relative to the board via the lifting device. The lifting device includes a first support member and a second support member. The first support member is movably connected to the cap and has a pivot end portion. The pivot end portion is movably connected to the first engaging structure and the second engaging structure and has at least one first abutting portion extending toward at least one first edge of the first hole and at least one second edge of the second hole along a pivot axis of the first engaging structure. The at least one first abutting portion abuts on the membrane circuit board to make the pivot end portion partially abut on the membrane circuit board for reducing an impact noise between the first support member and the board. The second support member is movably connected to the cap and the board. The second support member rotatably intersects with the first support member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
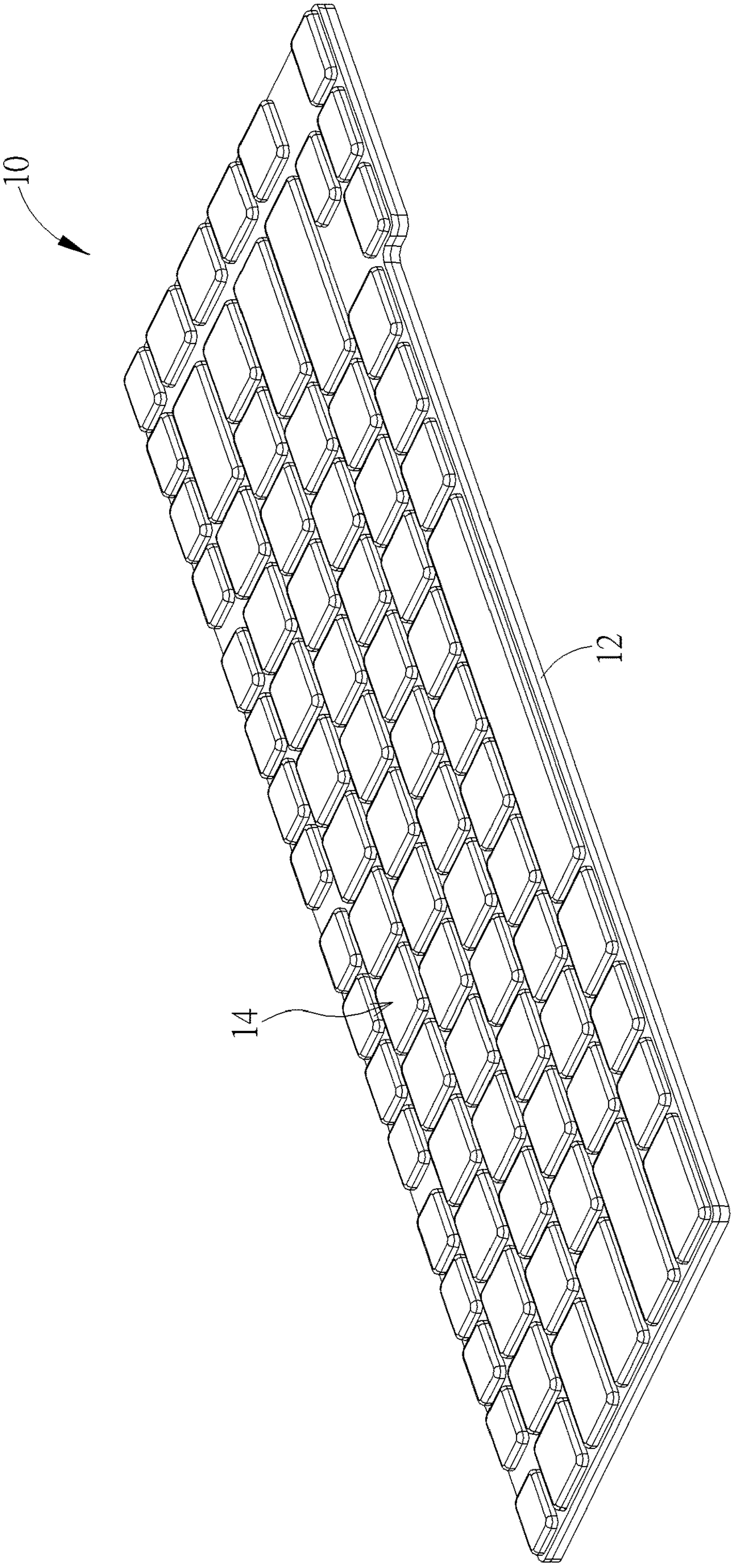
FIG. 1 is a diagram of a keyboard according to one embodiment of the present invention.

Please refer to FIG. 1, which is a diagram of a keyboard 10 according to one embodiment of the present invention. As shown in FIG. 1, the keyboard 10 includes a board 12 and a plurality of keyswitches 14. The plurality of keyswitches 14 is disposed on the board 12 for a user to press, thereby executing a desired input function. The keyboard 10 could be preferably a general keyboard device for personal computers, but the present invention is not limited thereto. For example, the keyboard 10 could also be applied to a portable electronic device with a foldable mechanism composed of an upper cover and a lower casing (e.g., a notebook or a foldable keyboard).

Figure 2:
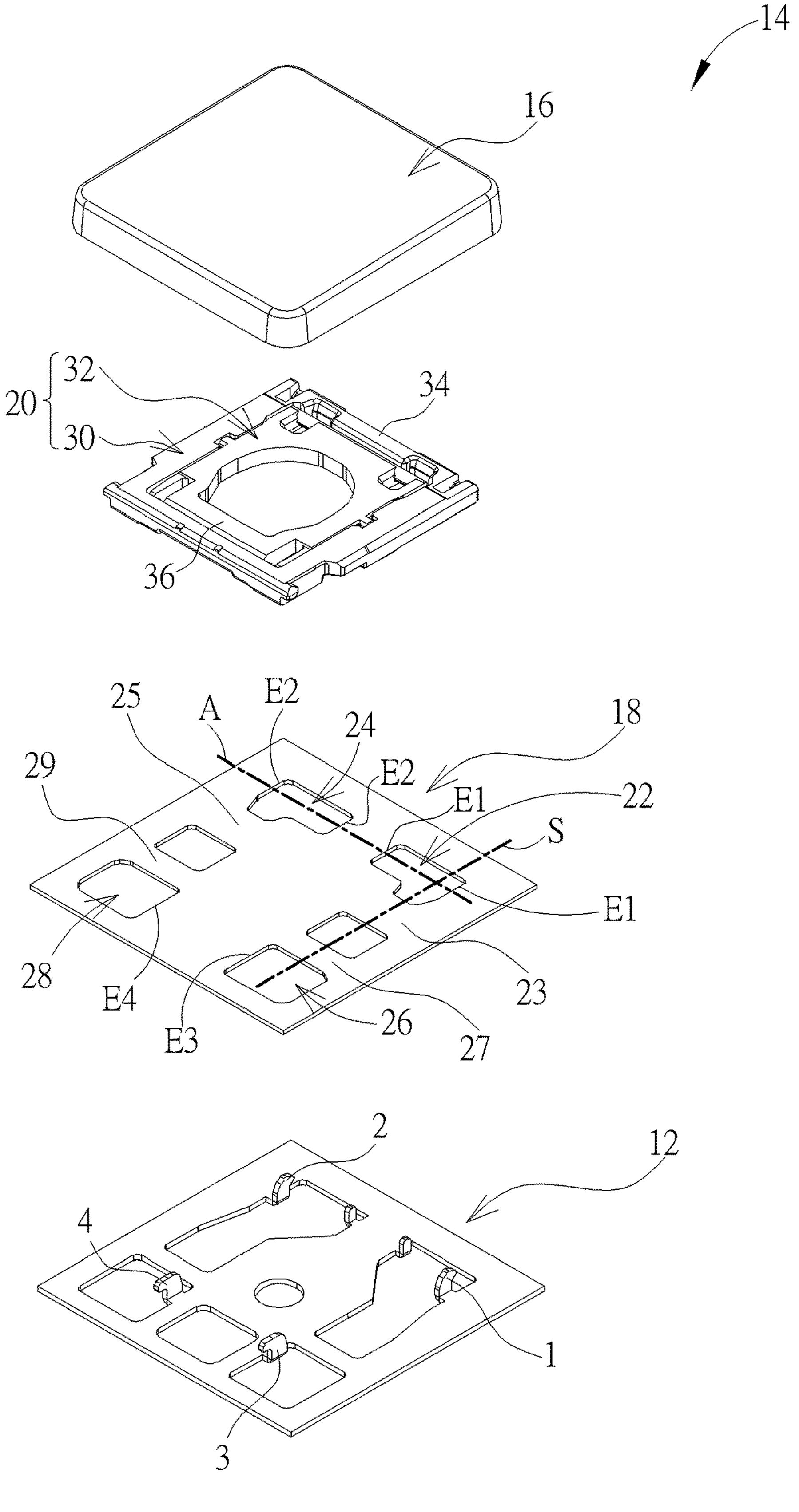
FIG. 2 is an exploded diagram of a keyswitch in FIG. 1.
Figure 3:
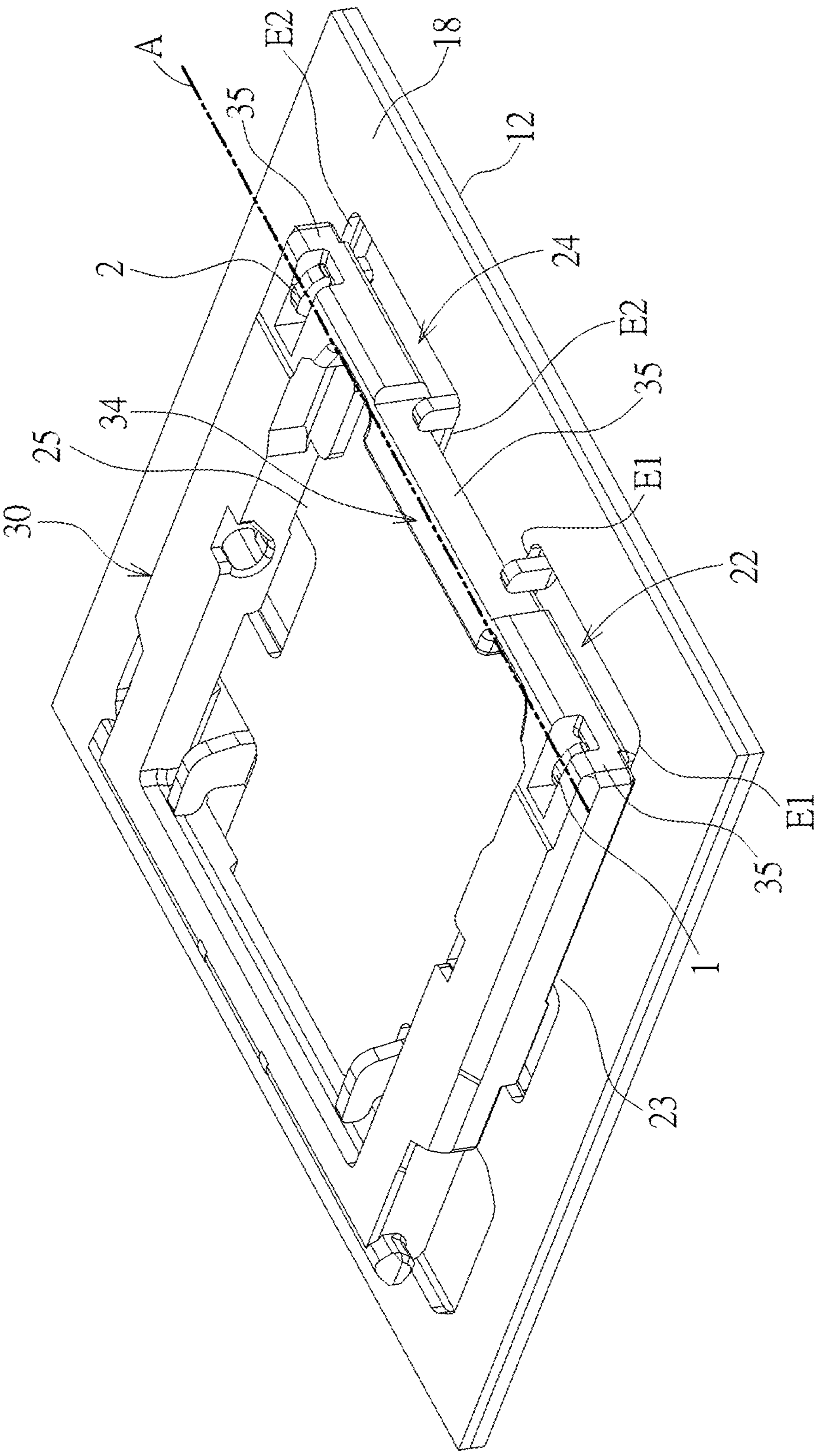
FIG. 3 is a diagram showing a first support member in FIG. 2 is connected to a board and abuts on a membrane circuit board.
Figure 4:
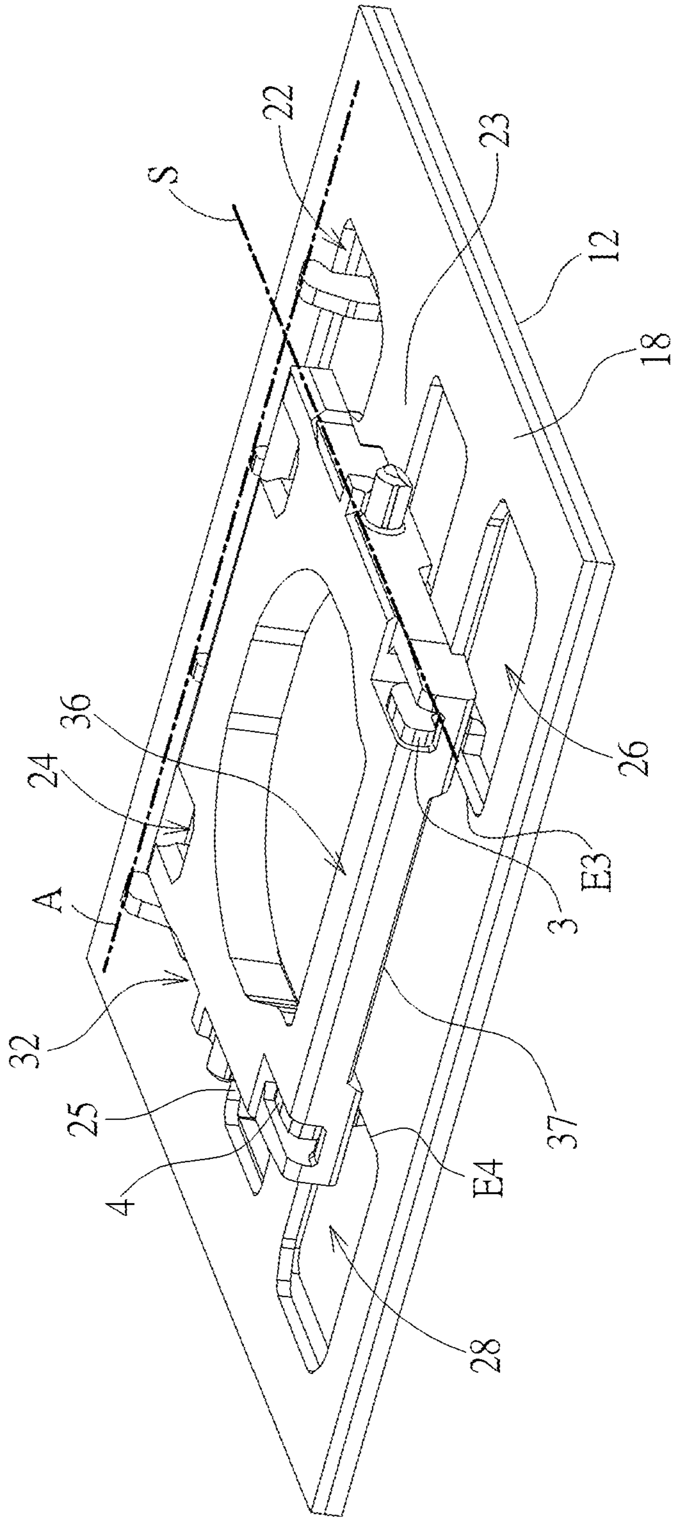
FIG. 4 is a diagram showing a second support member in FIG. 2 is connected to the board and abuts on the membrane circuit board.

The support design provided by the present invention could be applied to at least one of the plurality of keyswitches 14, and the actual number depends on the practical application of the keyboard 10. For simplicity, the following description focuses on one keyswitch 14 with the support design. As for the related description for other keyswitches 14 with the same support design, it could be reasoned by analogy. Please refer to FIGS. 2, 3, and 4. FIG. 2 is an exploded diagram of the keyswitch 14 in FIG. 1. FIG. 3 is a diagram showing the first support member 30 in FIG. 2 is connected to the board 12 and abuts on the membrane circuit board 18. FIG. 4 is a diagram showing the second support member 32 in FIG. 2 is connected to the board 12 and abuts on the membrane circuit board 18. As shown in FIGS. 2, 3, and 4, the keyswitch 14 includes a cap 16, the membrane circuit board 18, and a lifting device 20. The cap 16 is positioned above the board 12. The membrane circuit board 18 is disposed on the board 12, and the board 12 has a first engaging structure 1, a second engaging structure 2, a third engaging structure 3, and a fourth engaging structure 4 corresponding to the keyswitch 14. The membrane circuit board 18 forms a first hole 22 and a second hole 24 corresponding to the first engaging structure 1 and the second engaging structure 2 respectively, to make the first engaging structure 1 and the second engaging structure 2 protrude from the first hole 22 and the second hole 24 respectively. The membrane circuit board 18 forms a third hole 26 and a fourth hole 28 corresponding to the third engaging structure 3 and the fourth engaging structure 4 respectively, to make the third engaging structure 3 and the fourth engaging structure 4 protrude from the third hole 26 and the fourth hole 28 respectively. The third hole 26 is separated from the first hole 22 along a sliding axis S of the third engaging structure 3 by a first interval portion 27, and the fourth hole 28 is separated from the second hole 24 along the sliding axis S by a second interval portion 29.

The lifting device 20 is connected to the cap 16 and the board 12, to make the cap 16 movable relative to the board 12 via the lifting device 20. Accordingly, when the cap 16 is pressed, a switch on the membrane circuit board 18 can correspondingly be triggered (the related description for the triggering design is commonly seen in the prior art and omitted herein), so that the keyboard 10 can execute the desired input function. More specifically, in this embodiment, the lifting device 20 adopts a scissor lifting design and includes a first support member 30 and a second support member 32. The first support member 30 is movably (e.g., slidably) connected to the cap 16 and has a pivot end portion 34. The second support member 32 movably intersects with the first support member 30. The second support member 32 is movably (e.g., rotatably) connected to the cap 16 and has a sliding end portion 36.

The pivot end portion 34 is movably (e.g., rotatably) connected to the first engaging structure 1 and the second engaging structure 2, and could extend toward at least one first edge E1 of the first hole 22 and at least one second edge E2 of the second hole 24 along a pivot axis A of the first engaging structure 1 to form at least one first abutting portion 35 abutting on the membrane circuit board 18. For example, as shown in FIG. 3, the pivot end portion 34 could have a first abutting portion 35 extending outwardly from the first edge E1 located at an outer side of the first hole 22, a first abutting portion 35 extending inwardly from the first edge E1 located at an inner side of the first hole 22 and the second edge E2 located at an inner side of the second hole 24, and a first abutting portion 35 extending outwardly from the second edge E2 located at an outer side of the second hole 24, but the present invention is not limited thereto. The sliding end portion 36 is movably (e.g., slidably) connected to the third engaging structure 3 and the fourth engaging structure 4, and extends toward a third edge E3 of the third hole 26 and a fourth edge E4 of the fourth hole 28 along the pivot axis A to form a second abutting portion 37 (as shown in FIG. 4) abutting on the membrane circuit board 18. In such a manner, as shown in FIGS. 3 and 4, the pivot end portion 34 can partially abut on the membrane circuit board 18 and is separated from the board 12 to reduce an impact noise of the first support member 30 with the board 12. The sliding end portion 36 can partially abut on the membrane circuit board 18 and is separated from the board 12 to reduce an impact noise of the second support member 32 with the board 12. To be noted, the design of the sliding end portion of the second support member abutting on the membrane circuit board could be omitted to simplify the support structural design of the keyswitch. As for which design is adopted, it depends on the manufacturing requirements and practical applications of the keyboard of the present invention.

In summary, compared with the prior art in which the connecting end portion of the scissor lifting structure (e.g., the pivot end portion or the sliding end portion) is embedded into the hole of the membrane circuit board to be engaged with the hook of the board, the present invention adopts the design in which the membrane circuit board 18 is disposed on the board 12 and the first abutting portion 35 of the pivot end portion 34 of the first support member 30 and the second abutting portion 37 of the sliding end portion 36 of the second support member 32 respectively abut on the membrane circuit board 18. The aforesaid design generates the effect of separating the first support member 30 and the second support member 32 from the board 12 and absorbing impact sounds from the first support member 30 and the second support member 32 with the board 12 via the buffering characteristics of the membrane circuit board 18, thereby reducing the impact noise of the lifting device 20 with the board 12. In such a manner, the present invention can effectively solve the prior art problem that the scissor lifting structure would directly collide with the board to cause noise and vibration of the end portion of the support member, so as to greatly improve the user's tactile experience when pressing the keyswitch. It is more advantageous to use of the keyboard in quiet environments (such as offices, libraries, etc.), thereby enhancing the application flexibility of the keyboard in various environments.

Figure 5:
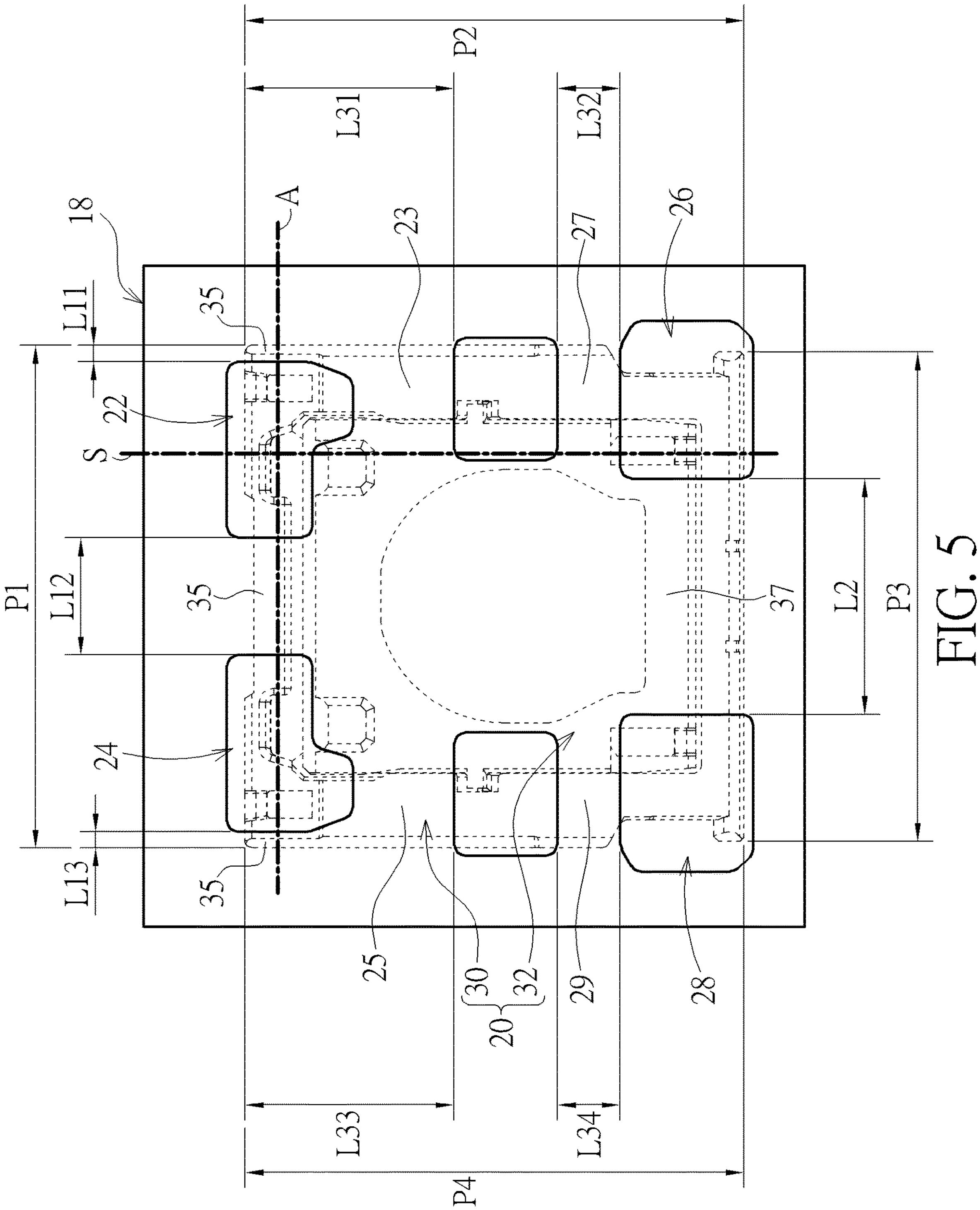
FIG. 5 is a top view showing a lifting device in FIG. 2 is disposed on the membrane circuit board.

It should be mentioned that the present invention could further adopt the design of increasing the support area of the membrane circuit board. For example, please refer to FIG. 2 and FIG. 5. FIG. 5 is a top view showing the lifting device 20 in FIG. 2 is disposed on the membrane circuit board 18. For clearly showing the configuration relationship between the lifting device 20 and the membrane circuit board 18, the lifting device 20 is presented in dashed lines in FIG. 5. As shown in FIG. 2 and FIG. 5, the membrane circuit board 18 extends along the pivot axis A to form a first intermediate bridge portion 23 and a second intermediate bridge portion 25 adjacent to the first hole 22 and the second hole 24, respectively, so as to increase the contact support area of the first support member 30 and the second support member 32 on the membrane circuit board 18. As such, the present invention can enhance the buffering and vibration-absorbing effect of the membrane circuit board 18 and reduce the overall hole area of the membrane circuit board 18 for increasing the circuit routing flexibility of the membrane circuit board 18.

Moreover, in the practical application, as shown in FIG. 5, the first abutting portion 35 has a first projection length on the membrane circuit board 18 along the pivot axis A (as shown in FIG. 5, which could be equal to a sum of projection lengths L11, L12, and L13 (e.g., 0.35 mm+3.2 mm+0.35 mm=3.9 mm)). The second abutting portion 37 has a second projection length on the membrane circuit board 18 along the pivot axis A (e.g., 6.42 mm). The first support member 30 has a third projection length on the first intermediate bridge portion 23, the first interval portion 27, the second intermediate bridge portion 25, and the second interval portion 29 along the sliding axis S (as shown in FIG. 5, which could be equal to a sum of projection lengths L31, L32, L33, and L34 (e.g., 5.55 mm+1.7 mm+5.55 mm+1.7 mm=14.5 mm)). A sum of the first projection length, the second projection length, and the third projection length could preferably have a ratio greater than 0.4 (e.g., (3.9 mm+6.42 mm+14.5 mm)/53.44 mm=0.464) compared to a projection perimeter of the lifting device 20 on the membrane circuit board 18 (as shown in FIG. 5, which could be equal to a sum of projection side lengths P1, P2, P3, and P4 (e.g., 13.5 mm+13.4 mm+13.14 mm+13.4 mm=53.44 mm)). In such a manner, the present invention can further enhance the buffering and vibration-absorbing effect of the membrane circuit board 18. It should be noted that the aforesaid length values are given as examples but not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyswitch comprising:

a board having a first engaging structure, a second engaging structure, a third engaging structure, and a fourth engaging structure;

a cap located above the board;

a membrane circuit board disposed on the board and having a first hole and a second hole formed corresponding to the first engaging structure and the second engaging structure respectively, to make the first engaging structure and the second engaging structure protrude from the first hole and the second hole respectively, wherein the membrane circuit board forms a third hole and a fourth hole respectively corresponding to the third engaging structure and the fourth engaging structure to make the third engaging structure and the fourth engaging structure protrude from the third hole and the fourth hole respectively, the third hole is separated from the first hole by a first interval portion along a sliding axis of the third engaging structure, and the fourth hole is separated from the second hole by a second interval portion along the sliding axis; and a lifting device connected to the cap and the board to make the cap movable relative to the board via the lifting device, the lifting device comprising:

a first support member movably connected to the cap and having a pivot end portion, the pivot end portion being movably connected to the first engaging structure and the second engaging structure and having at least one first abutting portion extending toward at least one first edge of the first hole and at least one second edge of the second hole along a pivot axis of the first engaging structure, and the at least one first abutting portion abutting on the membrane circuit board to make the pivot end portion partially abut on the membrane circuit board for reducing an impact noise between the first support member and the board; and a second support member movably connected to the cap and the board, the second support member rotatably intersecting with the first support member, the second support member having a sliding end portion movably connected to the third engaging structure and the fourth engaging structure, the sliding end portion having a second abutting portion extending toward a third edge of the third hole and a fourth edge of the fourth hole along the pivot axis, and the second abutting portion abutting on the membrane circuit board for reducing an impact noise between the second support member and the board;

wherein the membrane circuit board forms a first intermediate bridge portion and a second intermediate bridge portion along the pivot axis and adjacent to the first hole and the second hole respectively;

wherein a sum of a first projection length of the at least one first abutting portion on the membrane circuit board along the pivot axis, a second projection length of the second abutting portion on the membrane circuit board along the pivot axis, and a third projection length of the first support member on the first interval portion, the second interval portion, the first intermediate bridge portion, and the second intermediate bridge portion along the sliding axis has a ratio greater than 0.4 compared to a projection perimeter of the lifting device on the membrane circuit board.

2. A keyboard comprising:

a board; and a plurality of keyswitches disposed on the board, at least one of the plurality of keyswitches comprising:

a cap located above the board;

a membrane circuit board disposed on the board, the board having a first engaging structure, a second engaging structure, a third engaging structure, and a fourth engaging structure corresponding to the at least one of the plurality of keyswitches, and the membrane circuit board having a first hole and a second hole formed corresponding to the first engaging structure and the second engaging structure respectively, to make the first engaging structure and the second engaging structure protrude from the first hole and the second hole respectively, wherein the membrane circuit board forms a third hole and a fourth hole respectively corresponding to the third engaging structure and the fourth engaging structure to make the third engaging structure and the fourth engaging structure protrude from the third hole and the fourth hole respectively, the third hole is separated from the first hole by a first interval portion along a sliding axis of the third engaging structure, and the fourth hole is separated from the second hole by a second interval portion along the sliding axis; and a lifting device connected to the cap and the board to make the cap movable relative to the board via the lifting device, the lifting device comprising:

a first support member movably connected to the cap and having a pivot end portion, the pivot end portion being movably connected to the first engaging structure and the second engaging structure and having at least one first abutting portion extending toward at least one first edge of the first hole and at least one second edge of the second hole along a pivot axis of the first engaging structure, and the at least one first abutting portion abutting on the membrane circuit board to make the pivot end portion partially abut on the membrane circuit board for reducing an impact noise between the first support member and the board; and a second support member movably connected to the cap and the board, the second support member rotatably intersecting with the first support member, the second support member having a sliding end portion movably connected to the third engaging structure and the fourth engaging structure, the sliding end portion having a second abutting portion extending toward a third edge of the third hole and a fourth edge of the fourth hole along the pivot axis, and the second abutting portion abutting on the membrane circuit board for reducing an impact noise between the second support member and the board;

wherein the membrane circuit board forms a first intermediate bridge portion and a second intermediate bridge portion along the pivot axis and adjacent to the first hole and the second hole respectively;

wherein a sum of a first projection length of the at least one first abutting portion on the membrane circuit board along the pivot axis, a second projection length of the second abutting portion on the membrane circuit board along the pivot axis, and a third projection length of the first support member on the first interval portion, the second interval portion, the first intermediate bridge portion, and the second intermediate bridge portion along the sliding axis has a ratio greater than 0.4 compared to a projection perimeter of the lifting device on the membrane circuit board.

* * * * *